United States Patent [19]

Traber et al.

[11] 3,764,696

[45] Oct. 9, 1973

[54] COMBATTING BACTERIA WITH DIPHENYL THIOCARBONATES

[75] Inventors: Walter Traber, Riehen; Anton G. Weiss, Basel, both of Switzerland

[73] Assignee: Ciba-Geigy Corporation, Ardsley, N.Y.

[22] Filed: Aug. 2, 1971

[21] Appl. No.: 168,387

Related U.S. Application Data

[62] Division of Ser. No. 747,801, July 26, 1968, Pat. No. 3,637,790.

[30] Foreign Application Priority Data

Aug. 1, 1967  Switzerland...................... 10856/67

[52] U.S. Cl. ................................................ 424/301
[51] Int. Cl. ......................... A01n 9/12, A01n 9/24
[58] Field of Search....................... 424/301, 65, 76

[56] References Cited
UNITED STATES PATENTS

| | | | |
|---|---|---|---|
| 3,170,945 | 2/1965 | Schisla et al........................ | 424/301 |
| 3,234,082 | 2/1966 | Pranka et al........................ | 424/301 |
| 3,284,362 | 11/1966 | Zussman.............................. | 424/340 |
| 3,405,184 | 10/1968 | Widiger, Jr. et al................ | 424/340 |
| 3,445,398 | 5/1969 | Jungermann et al. .............. | 424/340 |
| 3,471,576 | 10/1969 | Klesper et al....................... | 424/340 |

FOREIGN PATENTS OR APPLICATIONS

| | | | |
|---|---|---|---|
| 1,022,744 | 3/1966 | Great Britain...................... | 424/340 |
| 552,250 | 11/1956 | Belgium.............................. | 260/455 |
| 659,636 | 8/1965 | Belgium | |

*Primary Examiner*—Albert T. Meyers
*Assistant Examiner*—Allen J. Robinson
*Attorney*—Karl F. Jorda and Frederick H. Robin

[57] ABSTRACT

Certain diphenyl thiocarbonates in which one alcohol moiety consists of an optionally substituted phenoxyphenyl radical and the other alcohol moiety consists of an optionally substituted phenyl or phenoxyphenyl radical, are disclosed as useful antibacterial agents.

15 Claims, No Drawings

COMBATTING BACTERIA WITH DIPHENYL THIOCARBONATES

CROSS REFERENCE TO RELATED APPLICATION

This application is a division of our application Ser. No. 747,801, filed on July 26, 1968 now U.S. Pat. No. 3,637,790.

DETAILED DISCLOSURE

The present invention concerns new diphenyl thiocarbonates, processes for the production of these esters as well as agents and processes for combatting microorganisms, particularly bacteria, using the new thiocarbonic acid esters and the organic material protected by treatment with such esters.

In this application, the four carbonic acid derivatives in which one or two oxygen atoms of the carbonic acid ($H_2CO_3$) are replaced by sulphur, are understood by the expression "thiocarbonates."

The new diphenyl thiocarbonates of general formula I

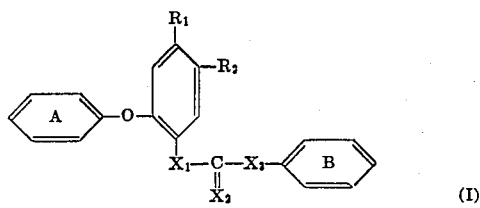

wherein
- the ring A represents the unsubstituted phenyl radical or a phenyl radical mono- to tri-substituted by halogen of an atomic number of at most 35 or by lower alkyl, or mono- or di-substituted by the trifluoromethyl group,
- the ring B represents the unsubstituted phenyl radical or a substituted phenyl radical, which can be mono- to pentasubstituted by halogen of an atomic number of at most 35, or mono- to tri-substituted by alkyl or alkoxy having one to nine carbon atoms, or mono- or di-substituted by the trifluoromethyl group, or which can be substituted by a phenyl or phenoxy radical being mono- to tri-substituted by halogen of an atomic number of at most 35 or by lower alkyl, or mono- or di-substituted by the trifluoromethyl group,
- $R_1$ and $R_2$ independently of each other each represent hydrogen or halogen of an atomic number of at most 35, and of the symbols
- $X_1$, $X_2$ and $X_3$ one or two represent sulphur and the remainder oxygen, are obtained according to the invention by reacting a diphenyl ether derivate of the general formula II

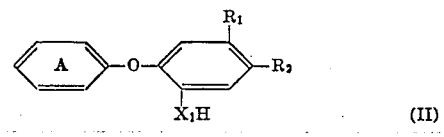

wherein the ring A, $R_1$ and $R_2$ have the meanings given in formula I, and $X_1$ represents sulphur or oxygen, either with a chlorocarbonic or chlorothiocarbonic acid derivative of the general formula III

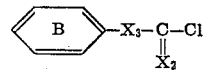

or with its components, capable of forming in situ this chlorocarbonic acid derivative of the general formula III, namely the compounds of the general formula IV

and of the general formula V

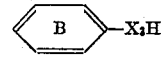

in which formulae
- the ring B has the meaning given in formula I, and
- $X_2$ and $X_3$ independently of each other each represent oxygen or sulphur but in cases wherein $X_1$ is oxygen, at least one of the symbols $X_2$ and $X_3$ is sulphur, the reaction preferably being performed in the presence of an acid binding agent.

According to the process of the invention, the diphenyl ether derivatives of the general formula II are preferably reacted direct with the chlorocarbonic or chlorothiocarbonic acid derivatives of the general formula III. The reaction is preferably performed in the presence of an organic or inorganic base and of a solvent or diluent which is inert to the reaction partners. In some cases, instead of a chlorocarbonic acid derivative of general formula III, its components of formulae IV and V, i.e., phosgene or thiophosgene (formula IV) and a phenol of thiophenol (formula V) are preferably used, and the chlorocarbonate of formula III which is then formed in situ is further used in the reaction.

As acid binding agents for the process according to the invention, organic bases such as tertiary amines, e.g., pyridine, triethylamine etc., and inorganic bases such as the hydroxides and carbonates of alkali and alkaline earth metals can be used. As solvents or diluents for the process mentioned, e.g. hydrocarbons, halogenated hydrocarbons, amides, ethers and ether-type compounds can be used.

In the above formulae, in particular chlorine and bromine are to be understood by halogen of an atomic number of at most 35.

To produce thionocarbonic acid esters according to the invention of the restricted general formula VI

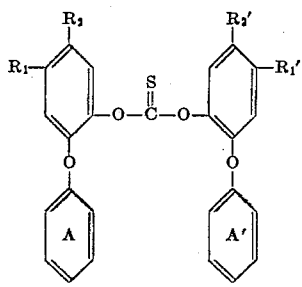

(VI)

wherein
the rings A and A' independently of each other each represent a phenyl radical, which is unsubstituted or substituted as defined for ring A in formula I, and
$R_1$, $R_1'$, $R_2$ and $R_2'$ independently of each other each represent hydrogen or halogen atoms of an atomic number of at most 35, 2 equivalents of a hydroxydiphenyl ether of the general formula VII

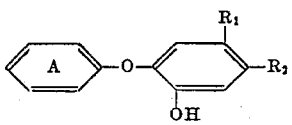

(VII)

are reacted with one equivalent of thiophosgene, or one equivalent of a hydroxydiphenyl ether of general formula VII is reacted with one equivalent of a chlorothionocarbonic acid ester of the general formula VIII

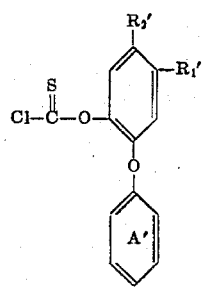

(VIII)

In the general formulae VII and VIII the rings A, A' and $R_1$, $R_1'$, $R_2$ and $R_2'$ have the meanings given in general formula VI.

The following can be used, for example, as starting materials of the general formula II. (These compounds also correspond to a component according to general formula V):

3', 4'-dichloro-2-hydroxy-diphenyl ether 3',4',4-trichloro-2-hydroxy-diphenyl ether
2',4'-dichloro-2-hydroxy-diphenyl ether
2',4'-dibromo-4-chloro-2-hydroxy-diphenyl ether
4-chloro-2-hydroxy-diphenyl ether
4,4'-dichloro-2-hydroxy-diphenyl ether
4-chloro-4'-bromo-2-hydroxy-diphenyl ether
4'-methyl-4-chloro-2-hydroxy-diphenyl ether
4,4'-dichloro-5-bromo-2-hydroxy-diphenyl ether
4,2',4'-trichloro-5-bromo-2-hydroxy-diphenyl ether
4,2',4'-trichloro-2-hydroxy-diphenyl ether
4-bromo-4'-chloro-2-hydroxy-diphenyl ether
2',4',5'-trichloro-2-hydroxy-diphenyl ether
4,2',4'-tribromo-2-hydroxy-diphenyl ether
4-bromo-2',4'-dichloro-2-hydroxy-diphenyl ether
4,4'-dibromo-2-hydroxy-diphenyl ether
4'-chloro-2-hydroxy-diphenyl ether and
4,4'-dichloro-3'-trifluoromethyl-2-hydroxy-diphenyl ether, as well as the correspondingly substituted 2-mercapto-diphenyl ethers.

The production of some diphenyl esters of general formula I is described in the following examples. The temperatures are given in degrees Centigrade and parts are to be understood as parts by weight and are related to parts by volume as grams to milliliters.

EXAMPLE 1

11.9 Parts of 2',4',4-trichloro-2-hydroxy-diphenyl ether and 3.24 parts of pyridine are dissolved in 27 parts by volume of methylene chloride. 9.61 Parts of S-(4-chlorophenyl) chlorodithiocarbonate in 10 parts by volume of methylene chloride are added dropwise to this solution while stirring at 0 – 5°. The reaction mixture is then stirred for several hours at room temperature whereupon the precipitate formed is filtered off under suction, the filtrate is washed with water, dried and the methylene chloride is distilled off. The residue crystallises. After recrystallisation from ethanol, the 0-[2-(2'',4''-dichlorophenoxy)-5-chlorophenyl]-S-(4'-chlorophenyl) dithiocarbonate melts at 127°–129°.

EXAMPLE 2

144.7 Parts of 2',4',4-trichloro-2-hydroxy-diphenyl ether (double the molar amount) and 39.5 parts of pyridine are dissolved in 600 parts by volume of methylene chloride. A solution of 28.5 parts of thiophosgene (simple molar amount) in 200 parts by volume of methylene chloride is added dropwise to this solution at a temperature between 10° and 20°. The reaction mixture is then stirred for 12 hours at room temperature after which the precipitate formed is separated. The filtrate is washed several times with water, dried and the solvent is distilled off in vacuo. The residue crystallises. After recrystallisation from ethanol, the 0,0-bis[2-(2',4'-dichlorophenoxy)-5-chlorophenyl] thionocarbonate melts at 119° – 120°.

EXAMPLE 3

10.5 Parts of 2-(4'-chlorophenoxy)-5-chlorophenol are dissolved in 40 parts by volume of methylene chloride and 3.24 parts of pyridine are added. 11.7 Parts of 4-tert.octylphenyl chlorothionocarbonate, diluted with 16 parts by volume of methylene chloride, are slowly added to this solution while stirring at 10° – 20°. The reaction mixture is then stirred for 2 hours at room temperature; the precipitated pyridine hydrochloride is filtered off and washed with a little methylene chloride. The methylene chloride solution is washed with water, dried with sodium sulphate and then the methylene chloride is distilled off. The highly viscous residue is distilled in a bomb tube under high vacuo. The 0-[2-(4'-chlorophenoxy)-5-chlorophenyl]-0-(4'-tert.octylphenyl) thiocarbonate is obtained as a blue-yellow oil; B.P. 200° – 210°/0.001 Torr.

EXAMPLE 4

11.1 Parts of 2-(4'-chlorophenoxy)-5-chlorothiophenol are dissolved in 27 parts by volume of methylene chloride and 3.24 parts of pyridine are added. 11 Parts of 4-tert.octylphenyl chlorocarbonate are slowly added dropwise to this solution while stirring at 10° – 20°. The reaction mixture is then stirred for 2 hours at room temperature; the precipitated pyridine hydrochloride is filtered off and washed with a little methylene chloride. The methylene chloride solution is washed with water, dried with sodium sulphate and then the methylene chloride is distilled off. The highly viscous residue is distilled in a bomb tube under high vacuum. The S-[2-(4'-chloro-phenoxy)-5-chlorophenyl]-O-(4'-tert.octylphenyl) thiocarbonate is obtained as a yellowish oil, B.P. 190° – 210°/0.001 Torr.

EXAMPLE 5

11.1 Parts of 2-(4'-chlorophenoxy)-5-chlorothiophenol are dissolved in 27 parts by volume of methylene chloride and 3.24 parts of pyridine are added. 11.7 Parts of 4-tert.octylphenyl chlorothionocarbonate are slowly added dropwise to this solution while stirring at 10° – 20°. The reaction mixture is then stirred for 2 hours at room temperature; the precipitated pyridine hydrochloride is filtered off and washed with a little methylene chloride. The methylene chloride solution is washed with water, dried with sodium sulphate and then the methylene chloride is distilled off. The highly viscous residue is distilled in a bomb tube under high vacuum. The S-[2-(4''-chlorophenoxy)-5-chlorophenyl]-O-(4'-tert.octylphenyl) dithiocarbonate is obtained as a yellowish oil; B.P. 210°–200°/0.001 Torr.

EXAMPLE 6

11.1 Parts of 2-(4'-chlorophenoxy)-5-chlorothiophenol and 3.2 parts of pyridine are dissolved in 27 parts by volume of methylene chloride. The solution is cooled to 10° and 10.4 parts of S-(2,5-dichlorophenyl) chlorothiocarbonate, dissolved in 10 parts by volume of methylene chloride are added dropwise. The reaction mixture is stirred for two hours at room temperature, filtered, the filtrate washed with water and dried with sodium sulphate. After evaporating the solvent, the oily residue is vacuum-distilled and the S-[2-(4''-chlorophenoxy)-5-chlorophenyl]-S-(2',5'-dichlorophenyl) dithiocarbonate is thus obtained, B.P. 200° – 210°/0.001 Torr.

The substituted diphenyl thiocarbonates summarised in the following Tables are obtained in the ways described in the above examples:

TABLE I

| Number | Compounds type —O$\overset{\overset{\text{S}}{\|}}{\text{C}}$O— | Boiling point (B.P.), Melting point (M.P.) |
|---|---|---|
| 1 | O-[2-(4''-chlorophenoxy)-5-chlorophenyl]-O-(4'-n-octylphenyl) thionocarbonate | B.P. 190–210°/0.001 torr. |
| 2 | O-[2-(2'',4''-dichlorophenoxy)-5-chlorophenyl]-O-(4'-n-octylphenyl) thionocarbonate | B.P. 200–210°/0.001 torr. |
| 3 | O-[2-(2'',4''-dichlorophenoxy)-5-chlorophenyl]-O-(4'-tert. octylphenyl) thionocarbonate | Do. |
| 4 | O-[2-(4''-chlorophenoxy)-5-chlorophenyl]-O-(4'-n-nonylphenyl) thionocarbonate | Do. |
| 5 | O-[2-(2'',4''-dichlorophenoxy)-5-chlorophenyl]-O-(4'-n-nonylphenyl) thionocarbonate | B.P. 205–215°/0.04–0.01 torr. |
| 6 | O-[2-(4''-chlorophenoxy)-5-chlorophenyl]-O-(4'-chlorophenyl) thionocarbonate | B.P. 200–228°/0.025 torr. |
| 7 | O-[2-(2'',4''-dichlorophenoxy)-5-chlorophenyl]-O-(4-methoxyphenyl) thionocarbonate | B.P. 200–210°/0.002 torr. |
| 8 | O-[2-(2'',4''-dichlorophenoxy)-5-chlorophenyl]-O-(2'-biphenyl)-thionocarbonate | B.P. 200–220°/0.001 torr. |
| 9 | O-[2-(2'',4''-dichlorophenoxy)-5-chlorophenyl]-O-(4'-biphenyl) thionocarbonate | M.P. 112–125°. |
| 10 | O,O-bis-[2-(4'-chlorophenoxy)-5-chlorophenyl] thionocarbonate | M.P. 132–134°. |
| 11 | O-[2-(4''-chlorophenoxy)-5-bromophenyl]-O-(2'-phenyl-phenyl) thionocarbonate | B.P. 200–220/0.0001 torr. |
| 12 | O-[2-(2'',4''-dichlorophenoxy)-4-bromo-5-chlorophenyl-O-2'-(2''',4'''-dichlorophenoxy)-5-chlorophenyl] thionocarbonate. | M.P. 127–128°. |
| 13 | O-[2-(2'',4''-dichlorophenoxy)-4-bromo-5-chlorophenyl]-O-(2'-phenyl-4'-chlorophenyl) thionocarbonate | M.P. 102–106°. |
| 14 | O-[2-(2'',4''-dichlorophenoxy)-4-bromo-5-chlorophenyl]-O-(4'-methoxyphenyl) thionocarbonate | M.P. 116–118°. |
| 15 | O-[2-(2'',4''-dichlorophenoxy)-4-bromo-5-chlorophenyl]-O-(4'-phenyl-phenyl) thionocarbonate | B.P. 240–260°/0.001 torr. |
| 16 | O-[2-(2'',4''-dichlorophenoxy)-4-bromo-5-chlorophenyl]-O-(2'-phenyl-phenyl) thionocarbonate | B.P. 240–260°/0.001 torr. |
| 17 | O-[2-(2'',4''-dichlorophenoxy)-4-bromo-5-chlorophenyl]-O-(2'-chloro-4'-phenyl-phenyl) thionocarbonate | M.P. 78–82°. |
| 18 | O-[2-(2'',4''-dibromophenoxy)-5-chlorophenyl]-O-(4'-methyoxy-phenyl) thionocarbonate | M.P. 100–101°. |
| 19 | O-[2-(2'',4''-dibromophenoxy)-5-chlorophenyl]-O-(2'-phenyl-4'-chlorophenyl) thionocarbonate | M.P. 58–60°. |
| 20 | O-[2-(2'',4''-dichlorophenoxy)-5-bromophenyl]-O-(2'-chloro-4'-phenyl-phenyl) thionocarbonate | B.P. 200–220°/0.001 torr. |
| 21 | O-[2-(2'',4''-dichlorophenoxy)-5-bromophenyl]-O-(4'-phenyl-phenyl) thionocarbonate | B.P. 220–240°/0.001 torr. |
| 22 | O-[2-(4''-bromophenoxy)-5-bromophenyl]-O-(4'-phenyl-phenyl) thionocarbonate | Do. |
| 23 | O-[2-(3''-trifluoromethyl-4''-chlorophenoxy)-5-chlorophenyl]-O-(4'-methoxyphenyl) thionocarbonate | M.P. 79–80°. |
| 24 | O-[2-(2'',4''-dichlorophenoxy)-5-chlorophenyl]-O-(pentachlorophenyl) thionocarbonate | |
| 25 | O-[2-(2'',4''-dichlorophenoxy)-5-chlorophenyl]-(4'-isopropoxyphenyl)-thionocarbonate | B.P. 200–210°/0.001 torr. |

TABLE II

| Number | Compounds type —O—$\overset{\overset{\text{O}}{\|}}{\text{C}}$—S— | Boiling point (B.P.), Melting point (M.P.) |
|---|---|---|
| 1 | O-[2-(2'',4''-dichlorophenoxy)-5-chlorophenyl]-S-(2',5'-dichlorophenyl) thiocarbonate | B.P. 180–200°/0.001 torr. |
| 2 | O-[2-(2'',4''-dichlorophenoxy)-5-chlorophenyl]-S-(4'-methylphenyl) thiocarbonte | M.P. 94–95°. |
| 3 | O-[2-(2'',4''-dibromophenoxy)-5-chlorophenyl]-S-(2',5'-dichlorophenyl) thiocarbonate | B.P. 160–180°/0.001 torr. |
| 4 | O-[2-(2''',4'''-dichlorophenoxy)-5-bromophenyl]-S-(2',5'-dichlorophenyl) thiocarbonate | M.P. 123–125°. |
| 5 | O-[2-(4''-chlorophenoxy)-5-bromophenyl]-S-(2',5'-dichlorophenyl) thiocarbonate | B.P. 180–200°/0.001 torr. |

TABLE III

| Number | Compounds type —O—C$\overset{\diagup \text{S}}{\diagdown \text{S}}$ | Boiling point (B.P.), Melting point (M.P.) |
|---|---|---|
| 1 | S-[2-(4''-chlorophenoxy)-5-chlorophenyl]-S-(2',5'-dichlorophenyl) dithiocarbonate | B.P. 200–210°/0.001 torr. |
| 2 | O-[2-(2'',4''-dichlorophenoxy)-5-chlorophenyl]-S-(phenyl) dithiocarbonate | B.P. 180–200°/0.001 torr. |
| 3 | O-[2-(2'',4''-dichlorophenoxy)-5-chlorophenyl]-S-(4'-methylphenyl) dithiocarbonate | M.P. 84–91°. |
| 4 | O-[2-(4''-methylphenoxy)-5-chlorophenyl]-S-(4'-chlorophenyl) dithiocarbonate | M.P. 69–70°. |
| 5 | O-[2-(2'',4''-dibromophenoxy)-5-chlorophenyl]-S-(4'-chlorophenyl) dithiocarbonate | M.P. 108–110°. |
| 6 | O-[2-(3'',4''-dichlorophenoxy)-5-chlorophenyl]-S-(4'chlorophenyl) dithiocarbonate | M.P. 79–80°. |

The new diphenyl thiocarbonates of general formula I have very good bactericidal and bacteriostatic properties against gram positive and gram negative bacteria such as Staphylococcus spec., e.g.: *Staphylococcus aureus Smith*, *Staphylococcus lactis*, also *Bacillus mesentericus*, *Bacillus pumilus*, *Bacillus subtilis*, *Coli* forms, *Corynebacterium diphtheriae*, *Clostridium botulium*, *Clostridium butyricum*, *Clostridium welchii*, *Clostridium tetani*, *Klebsiella pneumoniae*, *Alcaligenes faecalis*, *Sarcina* spec., *Salmonella typhi*, *Salmonella paratyphi* A and B, *Salmonella typhimurium*, *Salmonella enteritidis*, *Shigella dysenteriae*, *Shigella flexneri*, *Brucella abortus*, *Proteus mirabilis*, *Achromobacter* spec., *Serratia marcescens*, *Pasteurella pseudotuberculosis*. In addition, they have low toxicity to warm blooded animals and have no irritant action at all on the skin and muscous membranes. Because of these good properties, the new esters can be used for the most various purposes, e.g., for the protection of organic materials and useful objects, as disinfectant additives to cleansing materials of all types such as soaps, detergents, pharmaceutical preparations such as ointments, powders, disinfectants of all types, cosmetic and hygienic preparations. The new esters can serve as active substances in preparations both for internal and external use. Compared with bactericides and bacteriostatics known hitherto, the new thiocarbonic acid esters have excellent fastness to light so that they are very particularly suitable for use in soaps and cosmetics.

The diphenyl thiocarbonates of general formula I have an excellent growth-inhibiting action in various series of tests, such as the incorporation test (testing of the growth of bacteria or fungi on culture medium into which various concentrations of the active substances have been incorporated) described by X. Buhlmann, W. A. Vischer and H. Bruhin [Zbl. Bakt. Abteilung I, Originale, 180, 327–334 (1960)], and the diffusion test (measurement of the breadth of zones of inhibition) described by H. Bruhin and X. Buhlmann [Path. Microbiol. 26, 108–123(1963)], against gram positive and gram negative bacteria such as *Staphylococcus aureus*, *Escherichia coli*, *Klebsiella pneumoniae*, *Salmonella typhi*.

Bacteriostatic activity in vitro (incorporation test)

The active substance to be tested is dissolved in a suitable solvent and, if possible, the solution is further diluted with the same solvent. The concentrations of the solutions of active substance are so chosen that, after addition of the culture medium, the desired final concentration is attained. With water as solvent, the ratio of solution:culture medium should be about 1:10, with an organic solvent it is generally 1:100. In order to exclude a bacteriostatic action of the solvent used, a control is run with the solvent.

The solution of active substance is added to the still liquid agar culture and the mixture is poured into petri dishes so that each contains 20 ccm. After it has solidified, the culture medium is inoculated with suitable suspensions of bacteria. The media are then placed in an incubation chamber for 24 hours at 37°C. The test is evaluated by determining the lowest concentration at which growth of the bacteria is completely inhibited.

The figures given in the following Table are the minimal concentration which inhibits growth. They are shown in ppm (parts of active substance per $10^6$ parts of diluent), which corresponds to an amount of 1 γ per ccm.

| active substance | bacteria | | | |
|---|---|---|---|---|
| | Esch. coli NCTC 86 | Klebs. pneu. NCTC 7242 | Salm. typhi NCTC 8384 | Staph. aureus NCTC 7447 |
| O,O-bis-[2-(4''-chlorophenoxy)-5-chlorophenyl] thionocarbonate | <1 | <1 | <1 | <1 |
| O,O-bis-[2-(2'',4''-dichlorophenoxy)-5-chlorophenyl] thionocarbonate | <1 | <1 | <1 | <1 |
| O-[2-(4''-chlorophenoxy)-5-chlorophenyl]-O-(4'-tert.octylphenyl) thionocarbonate | 10 | 10 | 10 | 1 |
| O-[2-(2'',4''-dichlorophenoxy)-5-chlorophenyl]-O-(4'-tert.octylphenyl) phenyl) thionocarbonate | 10 | 10 | 10 | 1 |
| O-[2-(2'',4''-dichlorophenoxy(-5-chlorophenyl]-S-phenyl thionocarbonate | 1 | 1 | 1 | 0.1 |
| O-[2-(2'',4''-dichlorophenoxy)-5-chlorophenyl]-S-(4'-chlorophenyl) thionocarbonate | 1 | 10 | 10 | 0.1 |

Bacteriostatic activity in vitro (diffusion test)

The test substance is dissolved in a suitable solvent in a concentration of 5,000 γ/ccm.

Sterile strips of filter paper (5 × 85 mm, liquid take-up of each strip about 0.1 ccm) are dipped in the solution of test substance and then hung up to dry. Each strip is then placed in a petri dish (85 mm inner diameter, filled with 20ccm culture medium) and the dishes, containing uninoculated medium, are placed for 16 hours in an incubation chamber to allow the test substances to penetrate into the media. Only then is a strip of the medium inoculated with the bacteria for the test, after which they are incubated for 24 hours at 37°C.

As result, the size of the zone of inhibition, including the width of the filter paper strip, is given in mm.

| active substance | bacteria | | | |
|---|---|---|---|---|
| | Esch. coli NCTC 86 | Klebs. pneu. NCTC 7242 | Salm. typhi NCTC 8384 | Staph. aureus NCTC 7447 |
| O,O-bis-[2-(4''-chlorophenoxy)-5-chlorophenyl] thionocarbonate | 50 | 50 | 47 | 55 |
| O,O-bis-[2-(2'',4''-dichloro-phenoxy)-5-chlorophenyl] thionocarbonate | 42 | 33 | 34 | 55 |
| O-[2-(4''-chlorophenoxy)-5-chlorophenyl]-O-(4'-tert.octylphenyl) thionocarbonate | 47 | 39 | 35 | 49 |
| O-[2-(4''-chlorophenoxy)-5-chlorophenyl]-O-(4'-n-octylphenyl) thionocarbonate | 39 | 30 | 29 | 46 |
| O-[2-(2'',4''-dichlorophenoxy)-5-chlorophenyl]-O-(4'-tert.octylphenyl) thionocarbonate | 36 | 25 | 28 | 48 |
| O-[2-(2'',4''-dichlorophenoxy)-5-chlorophenyl]-S-phenyl dithiocarbonate | 62 | 56 | 50 | >60 |
| O-[2-(2'',4''-dichlorophenoxy)-5-chlorophenyl]-S-(4'-chlorophenyl) dithiocarbonate | 27 | 16 | 18 | 38 |

The diphenyl thiocarbonates of general formula I are particularly suitable for the disinfection and protection of goods to be laundered. Even when washing liquors containing oxidizing agents, including chlorine are used, their full bactericidal activity is retained for all practical purposes. Tests to determine the bacteriostatic activity of the new thiocarbonic esters are described below.

The following tests were made to determine the bacteriostatic activity in washing liquors containing chlorine:

The active substance, previously dissolved in a ratio of 1:100 in dimethyl formamide, is added in the concentrations given to a washing liquor containing 2.5 g/litre of soap (A) and to a washing liquor containing 2.5 g/litre soap and 2 ccm/litre of an aqueous sodium hypochlorite solution containing 15 percent active chlorine (B). Cotton fabric is introduced into this liquor (liquor ratio 1:20) and the liquor is heated to 90°C. The textile is treated for 20 minutes at this temperature, then rinsed twice for 3 minutes at 40°C with permutit-water (liquor ratio 1:20), wrung out and dried. Circular samples (20 mm diameter) are cut from this washed and treated textile and laid on agar plates which have been inoculated previously with 24 hour old cultures of *Staphylococcus aureus* SG 511 or *Escherichia coli* 96. The agar plates are then put into an incubating chamber for 24 hours at 37°C.

The values summarised in the following Table give the extent of the zones of inhibition around the sample in mm; the sign − means no formation of colonies and the sign + means formation of colonies under the sample.

| compounds | concentration in ppm | Staph. aureus A | BA | E. coli B | B |
|---|---|---|---|---|---|
| O-[2-(4''-chlorophenoxy)-5-chlorophenyl]-O-(4'-tert. octylphenyl) thionocarbonate | 100 | 8− | 5− | 8− | 5− |
|  | 200 | 10− | 9− | 10− | 8− |
| O-[2-(4''-chlorophenoxy)-5-chlorophenyl]-O-(4'-n-nonyl-phenyl) thionocarbonate | 100 | 7− | 5− | 6− | 4− |
|  | 200 | 9− | 6− | 8− | 5− |
| O-[2-(2'',4''-dichlorophenoxy)-5-chlorophenyl]-O-(4'-methoxyphenyl) thionocarbonate | 100 | 10− | 6− | 3− | 2− |
|  | 200 | 10− | 9− | 3− | 3− |
| O-[2-(2'',4''-dichlorophenoxy)-5-chlorphenyl]-O-(4'-biphenyl) thionocarbonate | 100 | 7− | 5− | 2− | 0− |
|  | 200 | 9− | 7− | 2− | 0− |
| O,O-bis-[2-(2'',4''-dichlorophenoxy)-5-chlorophenyl] thionocarbonate | 100 | 11− | 10− | 7− | 6− |
|  | 200 | 12− | 11− | 9− | 9− |
| O,O-bis-[2-(4'-chlorophenoxy)-5-chlorophenyl] thionocarbonate | 100 | 10− | 9− | 9− | 8− |
|  | 200 | 10− | 10− | 10− | 10− |
| O-[2-(2'',4''-dichlorophenoxy)-5-chlorophenyl]-S-(2',5'-dichlorophenyl) dithiocarbonate | 100 | 4− | 4− | 2− | 1− |
|  | 200 | 4− | 4− | 3− | 1− |
| O-[2-(2'',4''-dichlorophenoxy)-5-chlorophenyl]-S-(4'-chlorophenyl) dithiocarbonate | 100 | 5− | 4− | 3− | 2− |
|  | 200 | 6− | 5− | 4− | 3− |
| O-[2-(2'',4''-dichlorophenoxy)-5-chlorophenyl]-S-phenyl dithiocarbonate | 100 | 9− | 7− |  |  |
|  | 200 | 10− | 8− |  |  |
| 2-hydroxy-4,4'-dichlorophenyl ether (known from Belgian Pat. No. 659,636) | 100 | 13− | 0+ | 13− | 0+ |
|  | 200 | 14− | 0+ | 14− | 0+ |
| 2-hydroxy-4,2',4'-trichlorophenyl ether (known from Belgian Pat. No. 659,636) | 100 | 12− | 0+ | 9− | 0+ |
|  | 200 | 13− | 0+ | 9− | 0+ |

As wash-active substances, washing or rinsing liquors contain, e.g., anion active compounds such as aromatic sulphonic acids substituted by lipophilic groups or their water soluble salts such as the sodium salt of dodecylbenzene sulphonic acid, or water soluble salts of sulphuric acid monoesters of higher molecular alcohols or their polyglycol ethers, e.g., soluble salts of dodecyl alcohol sulphate, or of dodecyl alcohol polyglycol ether sulphate, or alkali metal salts of higher fatty acids (soaps), also non-ionic wash-active substances such as polyglycol ethers of higher fatty alcohols, also polyglycol ethers of higher molecular alkylated phenols as well as socalled "amphoteric" wash-active substances, e.g., reaction products of the alkali metal salts of low halogen fatty acids with polyalkylene polyamines containing lipophilic radicals such as with lauryl diethylenetriamine. In addition, the liquor can also contain the usual auxiliaries such as water soluble perborates, polyphosphates, carbonates, silicates, optical brighteners, plasticisers, salts having an acid reaction such as ammonium or zinc silicofluoride, or certain organic acids such as oxalic acid, also finishers, e.g. those based on synthetic resins, or starch.

Primarily organic fibre material, chiefly that of natural origin such as that containing cellulose, e.g., cotton, or containing polypeptide, e.g., wool or silk, or fibre material of synthetic origin such as that based on polyamide, polyacrylonitrile or polyester, or mixtures of the fibres mentioned above, can be sterilised with such washing or rinsing liquors containing compounds according to the invention.

In concentrations of about 1 − 200 ppm, the diphenyl thiocarbonates usable according to the invention lend both to the liquor as well as to the articles washed therewith substantial and long-lasting freedom from germs of the *Staphylococci* and *Coli* forms, and this is maintained even after exposure of the active substance or of the goods treated therewith. They differ from previously known compounds by their stability to light on the goods laundered therewith and by their great activity and breadth of action against gram positive and gram negative micro-organisms.

The new diphenyl thiocarbonates of general formula I are also effective against bacteria which cause perspiration odours so that they are suitable as deodorants for personal linen and for incorporation into cleaning agents such as soaps or shampoos, or as additives to other cosmetics.

In addition, the diphenyl thiocarbonates of formula I can be incorporated direct into the material to be protected, e.g., into material having a synthetic resin basis such as polyamides and polyvinyl chloride, into paper treatment liquors, into printing thickeners made to starch or cellulose derivatives, into lacquers and paints which contain, e.g., casein, into cellulose, into viscous spinning masses, paper, animal glues or oils, into permanent sizes based on polyvinyl alcohol, into cosmetics such as soaps, e.g., hand or toilet soaps, ointments or powders. In addition they can also be added to preparations of inorganic or organic pigments for the painting and decoration industry, plasticisers etc.

The diphenyl thiocarbonates of formula I can further be used in the form of their organic solutions, e.g., as sprays or in dry cleansing additives or for the impregnation of wood. For this purpose, organic solvents, preferably non-water miscible solvents, particularly petroleum fractions, also however, water miscible solvents such as low alcohols, e.g., methanol or ethanol or ethylene glycol monomethyl or monoethyl ether, can be used. The esters of formula I can be used in the form of their aqueous dispersions together with wetting or dispersing agents, e.g., for the protection of substances which tend to rot, e.g., leather, paper, etc.

Solutions or dispersions of active substance which can be used for the protection of these materials should have a content of active substance of at least 0.001 g/litre.

The bactericidal diphenyl thiocarbonates according to the invention can also serve as active substances in pharmaceutical preparations. The type of carrier depends largely on the intended use. For external application, e.g., for the disinfection of healthy skin as well as for the disinfection of the mouth and for the treatment of dermatoses and affections of the mucous membranes caused by bacteria, in particular ointments, powders and tinctures are used. Ointment foundations can be anhydrous, e.g., they can consist of mixtures of wool fat and vaseline, or they can also be aqueous dispersions in which the active substance is dispersed. Suitable carriers for powders are starches such as rice starch the specific weight of which, if desired, can be made light by the addition of highly dispersed silicic acid or more heavy by the addition of talcum. Tinctures contain the active substance(s) of formula I in aqueous, particularly 45 – 75 percent, ethanol to which, optionally, 10 – 20 percent of glycerin is added. Also solutions can be used for the disinfection of healthy skin. These are prepared with the aid of the usual solvents, e.g., polyethylene glycol, as well as dispersing agents. The content of active substance in the forms for application mentioned above is preferably betwen 0.1 and 5 percent.

For internal disinfection purposes, the new diphenyl thiocarbonates can be administered in solid dosage units such as tablets, dragees (sugar coated tablets) and capsules. These forms contain between 10 and 90 percent of a diphenyl thiocarbonate of the general formula I. They are administered in daily dosages of between 0.1 and 3 g to adult patients and in correspondingly reduced dosages to children. To produce tablets and dragee cores, the new esters are combined with solid pulverulent carriers such as lactose, saccharose, sorbitol, maize starch, potato starch or amylopectin, cellulose derivatives or gelatine, preferably with the addition of lubricants such as alkaline earth stearates, polyethylene glycol of suitable molecular weight. Dragee cores are then coated, e.g., with concentrated sugar soltuions which, in addition can also contain gum arabic, talcum and/or titanium dioxide, or with a lacquer dissolved in easily volatile organic solvents or mixtures of solvents. Dystuffs can also be added to these coatings. Soft gelatine capsules and other closed capsules consist, e.g., of a mixture of gelatine and glycerin and contain, e.g., mixtures of a thiocarbonic acid ester of general formula I with polyethylene glycol. Hard gelatine capsules contain, e.g., granulates of an active substance with solid pulverulent carriers.

In all these forms, whether they are intended for technical, cosmetic, hygienic or medicinal purposes, the new diphenyl thiocarbonates of general formula I can be the sole active substances or they can be combined with other known antimicrobial, particularly antibacterial and/or antimycotic active substances. They can be combined with, e.g., substituted salicylic acid alkylamides and alkyl anilides, substituted diphenyl ureas, benzoxazolones, polychlorohydroxydiphenyl methanes, halogen-hydroxy-diphenyl sulphides, halogenated hydroxydiphenyl ethers, bactericidal 2-imino-imidazolidines or bactericidal quaternary compounds, dithiocarbamic acid derivitives or with tetramethyl thiuram disulphide. Also carriers which themselves have a favourable pharmacological action, such as sulphur as powder foundation, or zinc stearate as component of ointment foundations, can be used. A broadening of the range of action and/or synergism occurs in some of the combinations mentioned of the thiocarbonic acid esters usable according to the invention with other antimicrobial active substances.

EXAMPLE 7

To a detergent composition liquefiable at high temperatures and composed of 40 parts of sodium soap based on lauric, myristic and palmitic acid,
30 parts of sodium tripolyphosphate,
5 parts of tetrasodium pyrophosphate,
4 parts of sodium silicate,
3 parts of magnesium silicate,
0.5 part of tetrasodium salt of ethylene diamine tetraacetic acid,
5 parts of sodium carbonate,
5.5 parts of sodium sulphate and
70 parts of water, there are added at 85 to 90°

0.2 part of 1-(3'-chlorophenyl)-3-(4''-chlorophenyl)-pyrazoline (optical brightener), and
1.0 part of 0,0'-bis-[2-(2',4'-dichlorophenoxy)-5-chlorophenyl]thionocarbonate.

The components are thoroughly mixed and then dried in the spray tower. A spreadable bactericidal detergent is obtained.

EXAMPLE 8

200 parts of soap powder, consisting of 88.0 percent mixture of the sodium salt of tallow fatty acid and sodium salt of coconut oil fatty acid (weight ration 70:30),
2.0 percent almond oil,
1.0 percent perfume,
0.2 percent titanium dioxide,
0.5 percent glycerol,
0.05 percent tetrasodium salt of ethylene diamine tetraacetic acid,
0.05 percent 1-(3'-chlorophenyl)-3-(4''-chlorophenyl)-pyrazoline (optical brightener),
2.0 percent of 0,0'-bis-[2-(4''-chlorophenoxy)-5-chlorphenyl] thionocarbonate, and
6.2 percent water together with 400 parts of water are worked at 80° into a homogeneous mass and then dried at 70° to 80° in vacuo. A brightened bactericidal soap material is obtained which can be formed into pieces or ground into powder.

EXAMPLE 9

992 parts of a heavy-duty non-soap synthetic detergent consisting of 152 parts of dodecyl benzene sulphonate,
38 parts of sodium salt of lauryl alcohol sulphonic acid ester, 256 parts of sodium tripolyphosphate,
76 parts of tetrasodium pyrophosphate,
40 parts of sodium silicate,
19 parts of magnesium silicate,
50 parts of sodium carbonate,
14 parts of carboxymethylcellulose,
3 parts of tetrasodium salt of ethylene diamine tetraacetic acid, and
344 parts of sodium sulphate are mixed with 1000 parts of water to form a homogeneous slurry. To this mixture are added 1 part of 4,4'-bis-[4'',6''-diphenylamino-1'',3'',5'',-triazinyl-(2'')-amino]-stilbene-2,2'-disulphonic acid (optical brightener) and 10 parts of 0-[2-(2'',4''-dichlorophenoxy)-5-chlorophenyl]-0-(4'-methoxyphenyl) thionocarbonate, the whole is mixed well then dried in the spray tower and grouned into a powder. A bactericidal synthetic detergent powder is thus obtained.

Some typical forms for application which are suitable for the treatment of dermatoses are described below. The following diphenyl thiocarbonates of general formula I for example, can be used in these as active substances:

0,0-bis-[2-(2',4'-dichlorophenoxy)-5-chlorophenyl] thionocarbonate 0,0-bis-[2-(4'-chlorophenoxy)-5-chlorophenyl] thionocarbonate 0-[2-(2'',4''-dichlorophenoxy)-5-chlorophenyl]-0-(4'-n-octylphenyl) thionocarbonate 0-[2-(4''-chlorophenoxy)-5-chlorophenyl]-0-(4'-n-nonylphenyl) thionocarbonate 0-[2-(2'',4''-dichlorophenoxy)-5-chlorophenyl]-S-(4'-methylphenyl) thionocarbonate 0-[2-(2'',4''-dichlorophenoxy)-5-chlorophenyl]-S-(2',5'-dichlorophenyl) thionocarbonate 0-[2-(2'',4''-dichlorophenoxy)-5-chlorophenyl]-S-phenyl dithiocarbonate 0-[2-(2'',4''-dichlorophenoxy)-5-chlorophenyl]-S-(4'-chlorophenyl) dithiocarbonate, 0[2-(2'',4''-dichlorophenoxy)-5-chlorophenyl]-S-(4'-methylphenyl) dithiocarbonate.

Hand Disinfectant

A solution of 3 parts of active substance and 3 parts of sodium sulphoricinoleate in 47 parts polyethylene glycol 400 and a solution of 7 parts of sodium dodecyl dodecyl sulphate in 39.85 parts of water are prepared. The two solutions are mixed and 0.15 parts of perfume are added to the mixture. The liquid obtained is dropped or sprayed onto the moist skin and rubbed in.

Powder

3 Parts of active substance are thoroughly mixed with 5 parts of zinc oxide, 41.9 parts of rice strach and with 50 parts of talcum which has been impregnated with 0.1 part of perfume. The mixture is sieved through a suitable, fine sieve and again well mixed.

Ointment

3 Parts of active substance are rubbed with 3 parts of paraffin oil and this is then added to the mixture of 10 parts of wool fat and 84 parts of white vaseline which has been melted at a moderate temperature. The mixture is allowed to cool while stirring.

Glove-wearing test

The hands of several test persons were treated with soap containing active substance as follows:

| | |
|---|---|
| moistening in 1.5 litres of sterile tap water | 15 seconds |
| soaping | 30 seconds |
| massaging | 90 seconds |
| rinsing | 30 seconds. |

These treatments were made every 3 hours of the day. As a control, the left hand is wetted with 1 ccm of physiological sodium chloride solution and then bound up in a sterile disposable glove. The glove is then worn for half an hour while using the hands normally, then stripped off and rised with 9 ccm of sterile physiological sodium chloride solution. 1 ccm of this solution is then put into petri dishes with a mixture of nutrient agar, serum and potassium tellurite and the dishes are put into an incubator for 24 hours at 37°. The germs are then counted.

These controls were made after the 3rd, 7th, and 11th washings. It was found that soaps containing one of the active substances given above in a concentration of 0.5 percent brought about a great reduction of the number of germs on the skin within 3 days.

We claim:
1. A composition for combating bacteria which comprises a carrier and a bactericidally effective amount of a compound of the formula

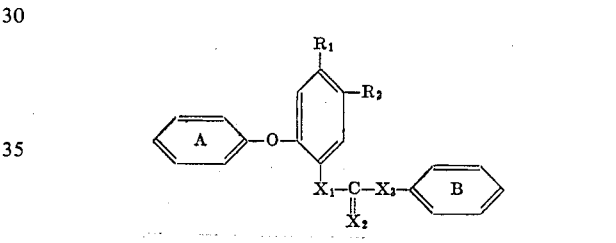

wherein
$R_1$ represents hydrogen, chlorine or bromine;
$R_2$ represents chlorine or bromine;
ring A is mono- to tri-substituted by members selected from the group consisting of chlorine, bromine, methyl and trifluoromethyl, with the proviso that there may be no more than on trifluoromethyl group;
ring B is unsubstituted; mono- to penta-substituted by chlorine; or mono- or di-substituted by members selected from the group consisting of chlorine, alkyl of from one to nine carbon atoms, alkoxy of from one to three carbon atoms and phenyl, with the proviso that there may be no more than one phenyl group; or ring B represents the grouping

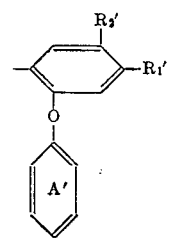

in which $R_1'$, $R_2'$ and ring $A'$ have the same meanings as $R_1$, $R_2$ and ring $A$ respectively; and one or two of $X_1$, $X_2$ and $X_3$ represent sulphur and the remainder represent oxygen.

2. The composition of claim 1 wherein said compound is 0,0'-bis-[2-(2'4'-dichlorophenoxy)-5-chlorophenyl] thionocarbonate.

3. The composition of claim 1 wherein said compound is 0,0'-bis-[2-(4'-chlorophenoxy)-5-chlorophenyl] thionocarbonate.

4. The composition of claim 1 wherein said compound is 0-[2-(2'',4''-dichlorophenoxy)-5-chlorophenyl]-0-(4'-methoxyphenyl) thionocarbonate.

5. The composition of claim 1 wherein said compound is 0[2-(4''-chlorophenoxy)-5-chlorophenyl]-0-(4'-tert.-octylphenyl) thionocarbonate.

6. The composition of claim 1 wherein said compound is 0-[2-(4''-chlorophenoxy)-5-chlorophenyl]-0-(4'-n-nonylphenyl) thionocarbonate.

7. The composition of claim 1 wherein said compound is 0-[2-(2'',4''-dichlorophenoxy)-5-chlorophenyl]-S-(phenyl) dithiocarbonate.

8. A method for combating bacteria which comprises applying to said bacteria a bactericidally effective amount of a compound of the formula

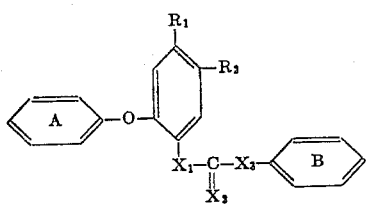

wherein $R_1$ represents hydrogen, chlorine or bromine;
$R_2$ represents chlorine or bromine;
ring A is mono- to tri-substituted by members selected from the group consisting of chlorine, bromine, methyl and trifluoromethyl, with the proviso that there may be no more than one trifluoromethyl group;
ring B is unsubstituted; mono- to penta-substituted by chlorine; or mono- or di-substituted by members selected from the group consisting of chlorine, alkyl of from one to nine carbon atoms, alkoxy of from one to three carbon atoms and phenyl, with the proviso that there may be no more than one phenyl group; or ring B represents the grouping

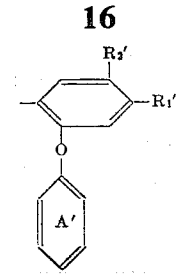

in which $R_1'$, $R_2'$ and ring $A'$ have the same meanings as $R_1$, $R_2$ and ring $A$ respectively; and one or two of $X_1$, $X_2$ and $X_3$ represent sulphur and the remainder represent oxygen.

9. A method according to claim 8 in which the compound has the formula

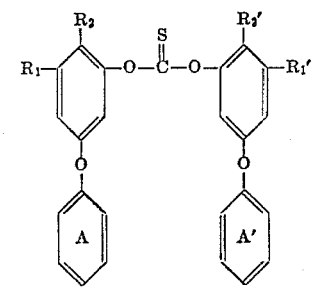

10. The method according to claim 9 in which the compound is 0,0'-bis-[2-(2',4'-dichlorophenoxy)-5-chlorophenyl] thionocarbonate.

11. The method according to claim 8 in which the compound is 0,0'-bis-[2-(4'-chlorophenoxy)-5-chlorophenyl]thionocarbonate.

12. The method according to claim 8 in which the compound is 0-[2-(2'',4''-dichlorophenoxy)-5-chlorophenyl]-0-(4'-methoxyphenyl) thionocarbonate.

13. The method according to claim 8 in which the compound is 0-[2-(4''-chlorophenoxy)-5-chlorophenyl]-0-(4'tert.-octylphenyl) thionocarbonate.

14. The method according to claim 8 in which the compound is 0-[2-(4''-chlorophenoxy)-5-chlorophenyl]-0-(4'-n-nonyl-phenyl) thionocarbonate.

15. The method according to claim 8 in which the compound is 0-[2-(2'',4''-dichlorophenoxy)-5-chlorophenyl]-S-(phenyl)-dithiocarbonate.

* * * * *